US008234410B2

(12) United States Patent
Alexander et al.

(10) Patent No.: US 8,234,410 B2
(45) Date of Patent: Jul. 31, 2012

(54) SUBSCRIBER DRIVEN MEDIA AGNOSTIC CONTENT DELIVERY ACROSS NETWORKS (75) Inventors: Michael E. Alexander, Great Falls, VA (US); Sri Ramanathan, Lutz, FL (US); Frank A. Schaffa, Hartsdale, NY (US); Matthew B. Trevathan, Kennesaw, GA (US)

(73) Assignee: International Business Machines Corporation, Armonk, NY (US)

( * ) Notice: Subject to any disclaimer, the term of this patent is extended or adjusted under 35 U.S.C. 154(b) by 461 days.

(21) Appl. No.: 11/969,550

(22) Filed: Jan. 4, 2008

(65) Prior Publication Data

US 2009/0177794 A1 Jul. 9, 2009

(51) Int. Cl.
*G06F 15/16* (2006.01)

(52) U.S. Cl. .................. 709/246; 709/206; 709/247

(58) Field of Classification Search .................. 709/246
See application file for complete search history.

(56) References Cited

U.S. PATENT DOCUMENTS

| 5,621,727 | A | | 4/1997 | Vaudreuil |
| 6,157,945 | A | * | 12/2000 | Balma et al. .................. 709/206 |
| 6,751,673 | B2 | | 6/2004 | Shaw |
| 6,854,007 | B1 | * | 2/2005 | Hammond .................. 709/206 |
| 6,965,917 | B1 | * | 11/2005 | Aloni et al. .................. 709/206 |
| 6,996,393 | B2 | | 2/2006 | Pyhälammi et al. |
| 6,999,566 | B1 | * | 2/2006 | Eason et al. ............. 379/88.22 |
| 7,030,730 | B1 | * | 4/2006 | Zondervan .................. 340/7.29 |
| 7,035,653 | B2 | | 4/2006 | Simon et al. |
| 7,653,001 | B2 | | 1/2010 | Agrawal et al. |
| 7,668,765 | B2 | | 2/2010 | Tanaka et al. |
| 2002/0129371 | A1 | | 9/2002 | Emura et al. |
| 2002/0143972 | A1 | * | 10/2002 | Christopoulos et al. ....... 709/231 |
| 2002/0147778 | A1 | * | 10/2002 | Dutta ........................... 709/206 |
| 2005/0009541 | A1 | * | 1/2005 | Ye et al. ....................... 455/466 |
| 2005/0114784 | A1 | * | 5/2005 | Spring et al. .................. 715/762 |
| 2005/0136895 | A1 | * | 6/2005 | Thenthiruperai et al. . 455/412.2 |
| 2006/0015649 | A1 | * | 1/2006 | Zutaut et al. ................. 709/246 |
| 2006/0272028 | A1 | | 11/2006 | Maes |
| 2007/0055783 | A1 | * | 3/2007 | Gourraud ..................... 709/227 |
| 2007/0162228 | A1 | | 7/2007 | Mitchell |
| 2008/0082649 | A1 | * | 4/2008 | Gazier et al. ................. 709/223 |
| 2008/0101455 | A1 | * | 5/2008 | Scheelke .................. 375/240.01 |
| 2008/0207182 | A1 | | 8/2008 | Maharajh et al. |
| 2008/0292074 | A1 | * | 11/2008 | Boni et al. ................. 379/93.11 |

OTHER PUBLICATIONS

Lemlouma, Tayeb et al. "Adapted Content Delivery for Different Contexts", IEEE Computer Society, Proceedings of the 2003 Symposium on Applications and the Internet.

(Continued)

*Primary Examiner* — Christopher Biagini
(74) *Attorney, Agent, or Firm* — Anna Linne; Roberts Mlotkowski Safran & Cole. P.C.

(57) ABSTRACT

A system and method is provided to facilitate subscriber driven media agnostic content delivery across same or different networks. The method includes receiving preferences from a sending client and a receiving client and receiving content of a first media type over a network. The method further includes sending the content or a reference to the content to the receiving client in a preferred media type and to a preferred device in accordance with at least one preference of the receiving client. The method also includes notifying at least the receiving client that the content is to be received by the preferred device.

35 Claims, 5 Drawing Sheets

OTHER PUBLICATIONS

Wan, Andrew et al., "Profile Based Routing and Billing Multimedia Content Delivery Network", IEEE Computer Society, Proceedings of the International Conference on Networking, International Conference on Systems and International Conference on Mobile Communications and Learning Technologies, 2006.

Camarillo, C. et al, "RFC 4117—Transcoding Services Invocation in the Session Initiation Protocol (SIP) Using Third Party Call Control (3pcc)", URL: http://www.packetizer.com/rfc/rfc4117, Jun. 2005.

3rd Generation Partnership Project 2 "3GPP2", "MMS MM1 Stage 3, Using SIP", Jun. 2004.

Pospischil, Günther et al., "A Location-based Push Architecture using SIP", 2001.

Office Action dated Jan. 24, 2011 for corresponding U.S. Appl. No. 11/969,536.

Final Office Action dated Jul. 12, 2011 for corresponding U.S. Appl. No. 11/969,536.

\* cited by examiner

SUBSCRIBER DRIVEN MEDIA AGNOSTIC CONTENT DELIVERY ACROSS NETWORKS

FIELD OF THE INVENTION

The invention generally relates to a system and method for computer systems and, more particularly, the invention relates to a system and method to facilitate subscriber driven media agnostic content delivery across same or different networks.

BACKGROUND OF THE INVENTION

In recent years, the digital media marketplace has been ever expanding. For example, more and more content is migrating from traditional mechanisms to be digitally generated, electronically distributed and rendered in a variety of mechanisms. With this known, there are many trends in the market place today.

For example, while most Tier 1 content is generated by content creators such as movie studios and record labels, more and more content is generated by individuals. For this reason, better tooling and content creation environments are increasingly becoming commoditized, putting these creation capabilities in the hands of individuals. But, while Tier 1 content creators have worked hard to spend significant money on infrastructure to traditionally and digitally distribute the content, the Internet is, itself, now permitting individuals to play a more significant role in the distribution of content. In fact, peer to peer content sharing mechanisms have become commonplace, becoming the single biggest consumer of Internet bandwidth globally.

While the Tier 1 content creators, aggregators, and distributors and device manufacturers all want to restrict where and how the content is rendered (so that they can then work towards maximizing their portion of the revenue), individuals want control over where and how they view the content of their choice. For this reason, individuals are creating their own content and using peer to peer content sharing mechanisms to distribute such content. However, the sharing of content becomes very difficult, if not impossible, with competing and incompatible communication protocols, media formats, different standards for media conversion and content delivery mechanisms.

Accordingly, there exists a need in the art to overcome the deficiencies and limitations described hereinabove.

SUMMARY OF THE INVENTION

In a first aspect of the invention, a method comprises receiving preferences from a sending client and a receiving client and receiving content of a first media type over a network. The method further includes sending the content or a reference to the content to the receiving client in a preferred media type and to a preferred device in accordance with at least one preference of the receiving client. The method further includes notifying at least the receiving client that the content is to be received by the preferred device.

In another aspect of the invention, a method is provided for sending subscriber driven media agnostic content delivery across different networks. The method comprises providing a computer infrastructure operable to parse preferences of a sending client and a receiving client in order to send content or a reference to the content to the receiving client in a preferred media type and to a preferred device and to notify at least the receiving client that the content is to be received by the preferred device.

In another aspect of the invention, a network infrastructure is provided which comprises at least an agent configured to receive and store preferences of a sending client and a receiving client. The network infrastructure is further configured to, based on the preferences: convert a first media type sent from the sending client to a second media type requested by the receiving client; send a notification to the receiving client on a first device that the second media type is ready to be downloaded on a preferred device; and send the second media type to the preferred device of the receiving client which is compatible with the second media type.

In yet another aspect of the invention, a computer program product is provided for managing subscriber driven media agnostic content delivery across networks. The computer program product comprises: a computer readable media; first program instructions to receive preferences from a sending client and a receiving client; second program instructions to receive content of a first media type over a network; third program instructions to send the content or a reference to the content to the receiving client in a preferred media type and to a preferred device in accordance with at least one preference of the receiving client; and fourth program instructions to notify at least the receiving client that the content is to be received by the preferred device. The first, second, third and fourth program instructions are stored on the computer readable media.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION OF EMBODIMENTS OF THE INVENTION

The invention generally relates to a system and method for computer systems and, more particularly, the invention relates to a system and method to facilitate subscriber driven media agnostic content delivery across same or different networks. The system and method of the invention provides a unique mechanism and infrastructure focused on peer to peer distribution and delivery of content. For example, the system and method of the present invention is structured and configured to use existing telecommunications networks, i.e., primarily non-IMS (IP Multimedia Subsystem) based networks, as well as IMS based core networks, to deliver content of different types to different compatible and incompatible devices. As should be known to those of skill in the art, IMS is an architectural framework for delivering internet protocol (IP) multimedia to mobile users.) As such, the system and method of the present invention can be supported on a completely wireless broadband based architecture where the focus has shifted from an access based provider to one that is primarily content driven over "fat pipes."

Accordingly, in implementation, service providers can support end to end points implementing the system and method of the present invention, even through an extended migratory period from non-IMS enabled networks to IBM enabled networks. The service providers can also support end to end points, regardless of the devices and media type. Also, the system and method of the invention provides a flexible means of media management.

System Environment

Figure 1:
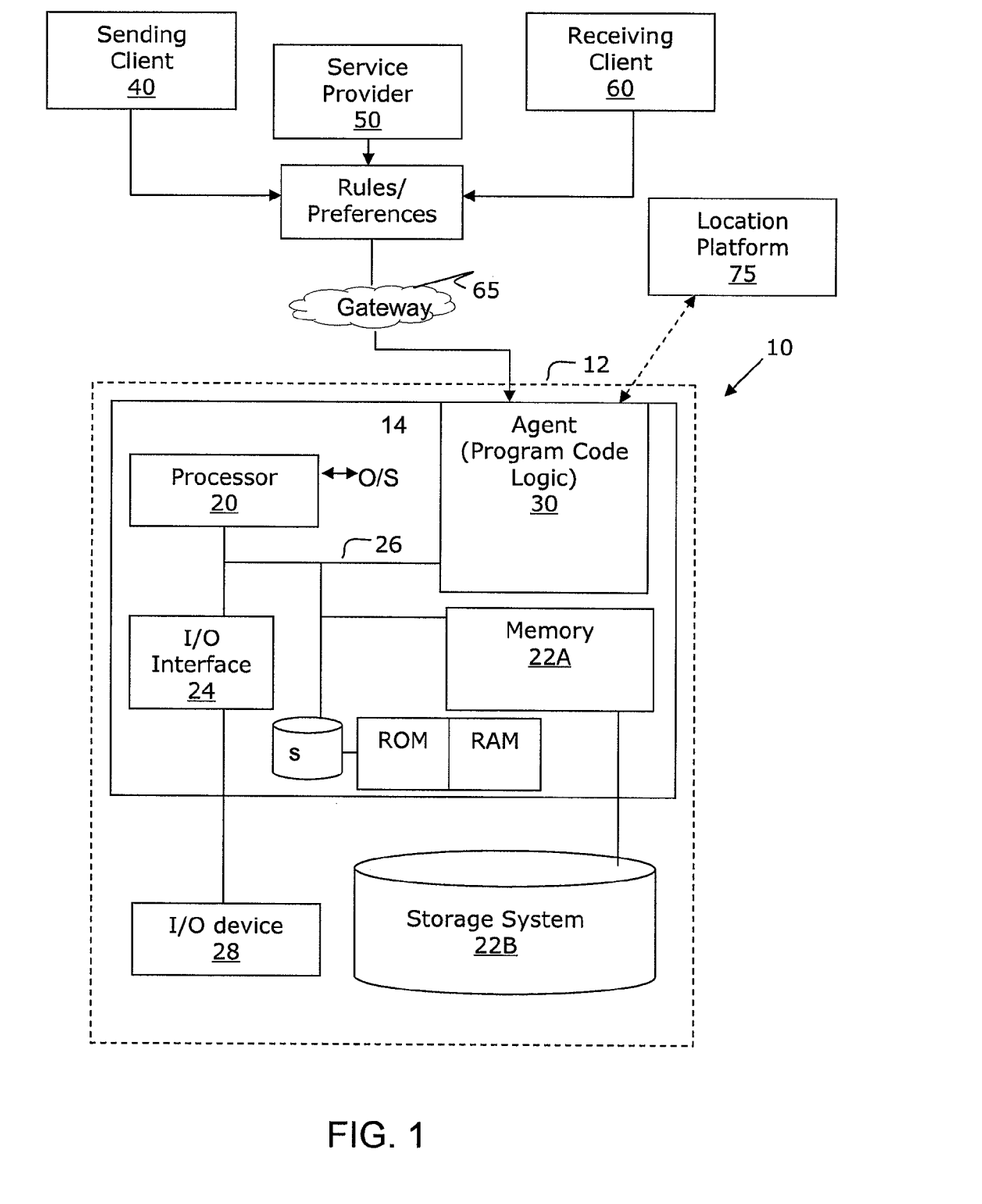
FIG. 1 shows an illustrative environment for implementing aspects of the present invention.

FIG. 1 shows an illustrative environment 10 for managing the processes in accordance with the invention. The environment 10 includes a computer infrastructure 12 that includes a computing device 14. The computing device 14 comprises an Agent 30 (also referred to as a Media Processing and Distribution Agent), which makes the computing device 14 operable to route content (e.g., multimedia content) of different types over different types of networks and/or protocols and/or to disparate devices based on rules (also referred generally as preferences and/or profiles) provided by, for example, a sending client 40, a service provider 50 and/or a receiving client 60, via a gateway 65. (See also discussion of FIG. 5.)

In embodiments, the service provider can be a Solution Integrator, content provider, telecommunications company, or other third party offering to perform the processes described herein. In this case, the service provider can create, maintain, deploy, support, etc., the computer infrastructure 12 that performs the process steps of the invention for one or more customers, e.g., a sending client 40 and/or a receiving client 60. In return, the service provider can receive payment from the customer(s) under a subscription and/or fee agreement.

The sending client 40, service provider 50 and/or receiving client 60 can provide preferences to the Agent 30, via a Messaging Gateway Framework 65. The Messaging Gateway Framework 65 may also be provided to send notifications and messages (including content of different types using different protocols) to the sending client 40 and the receiving client 60, using a host of protocols (as discussed herein) and regardless of the device of the sending or receiving client. The preferences can be stored in a storage system (e.g., highly scalable database) 22B. The storage system can be, for example, a Home Subscriber Service (HSS) Profile Manager, in the case of IMS content.

By defining the preferences, the present invention provides a flexible means of media management, which media can be manipulated. That is, by defining the preferences the Agent 30 can efficiently enable the distribution of content, from a subscriber to another subscriber or set of subscribers, using a set of subscriber defined preferences, for both IMS and non IMS domains. The subscribers can be, for example, the sending client 40, service provider 50 and/or receiving client 60. The preferences can include, for example:

A list of preferred devices to receive content (e.g., IMS or non-IMS enabled devices such as, for example, cellular telephone or set-top box (STB), to name a few;

A location preference of the receiving client 60 (e.g., a location to receive content);

A list of desired notification types to inform the sending client 40 and/or the receiving client 60 of content;

A desired media format (media type) (in this way, the receiving client 60 no longer has to worry about media type, given the proliferation of media types and the fact that there are different standards for media conversion, which are constantly being changed by standards bodies);

A list of "best times" to send and/or receive content and a size limit of content that will be accepted, for example;

A request by the receiving client 60 to view the same content on multiple devices; and/or Other Quality of Service Attributes (QSA) associated with the delivery of content.

As one preference is a desired media type, the present invention contemplates whether transcoding of the content is necessary in order for the receiving client 60 to view the content, amongst other features. In the case of transcoding, the Agent 30 can allow content and metadata transformation as part of the workflow processing to satisfy all requests. A determination as to the type of content and whether the content needs to be transformed can be made by the Agent 30, for example, by parsing header information of the content. Also, in implementation, the present invention factors in location based delivery via integration to a network housed location platform 75, using protocols such as Open LS or Parlay X.

In further implementations, the Agent 30 supports a variety of notification and delivery channels. For example, it is contemplated that the Agent 30 can support XMPP (Extensible Messaging and Presence Protocol), MMSC (Multimedia Messaging Switching Center), WAP (Wireless Application Protocol), SMS (Short Message Service) and SMTP (Simple Mail Transfer Protocol) (including out of band notifications), IMS Handsets via a SIP (Session Initiation Protocol) client, Web Services (SOAP and REST) and STB. The Web Services allow application and automated process integration where required. In the case of an IMS network, the Agent 30 can incorporate SIP based session control (or provide instructions for such session control) while ensuring that the actual digital media is referenced as an external object that can then be referenced in the media stream via a media server. In this way, the system can support a plethora of handsets (e.g., 2G, 3G and possibly 4G handsets), each of which have different rendering capabilities, browser based applications, portable media players, gaming consoles, non standard devices such as Set Top Boxes and applications which are endpoints by means of using REST or SOAP style invocations and providing end point implementations. The Agent 30 can also provide for or set-up necessary edge based caching so as to optimize delivery of the content, and provide for integration into both an IMS and non-IMS accounting and charging platforms.

The computing device 14 includes a processor 20, a memory 22A, an input/output (I/O) interface 24, and a bus 26. The memory 22A can include local memory employed during actual execution of program code, bulk storage, and cache memories which provide temporary storage of at least some program code in order to reduce the number of times code must be retrieved from bulk storage during execution. Further, the computing device 14 is in communication with an external I/O device/resource 28 and the storage system 22B. As should be understood, in certain implementation such as non-IMS enabled networks, the storage system 22B may be internal to the Agent 30.

The I/O device 28 can comprise any device that enables an individual to interact with the computing device 14 or any device that enables the computing device 14 to communicate with one or more other computing devices using any type of communications link. For example, the external I/O device/resource 28 may be keyboards, displays, pointing devices, etc.

In general, the processor 20 executes the program code, which is stored in memory 22A and/or the storage system 22B and/or the Agent 30. While executing the program code, the processor 20 can read and/or write data to/from the memory 22A, storage system 22B, I/O interface 24, and/or Agent 30. The bus 26 provides a communications link between each of the components in the computing device 14.

The computing device 14 can comprise any general purpose computing article of manufacture capable of executing computer program code installed thereon (e.g., a personal computer, server, handheld device, etc.). However, it is understood that the computing device 14 is only representative of various possible equivalent computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in embodiments, the computer infrastructure 12 comprises two or more computing devices (e.g., a server cluster) that communicate over any type of communications link, such as a network, a shared memory, or the like, to perform the process described herein. Further, while performing the processes described herein, one or more computing devices in the computer infrastructure 12 can communicate with one or more other computing devices external to the computer infrastructure 12 using any type of communications link (e.g., location platform, gateway, etc.). The communications link can comprise any combination of wired and/or wireless links; any combination of one or more types of networks (e.g., the Internet, a wide area network, a local area network, a virtual private network, etc.); and/or utilize any combination of transmission techniques and protocols.

Exemplary Processes in Accordance with the Invention

Figure 2:
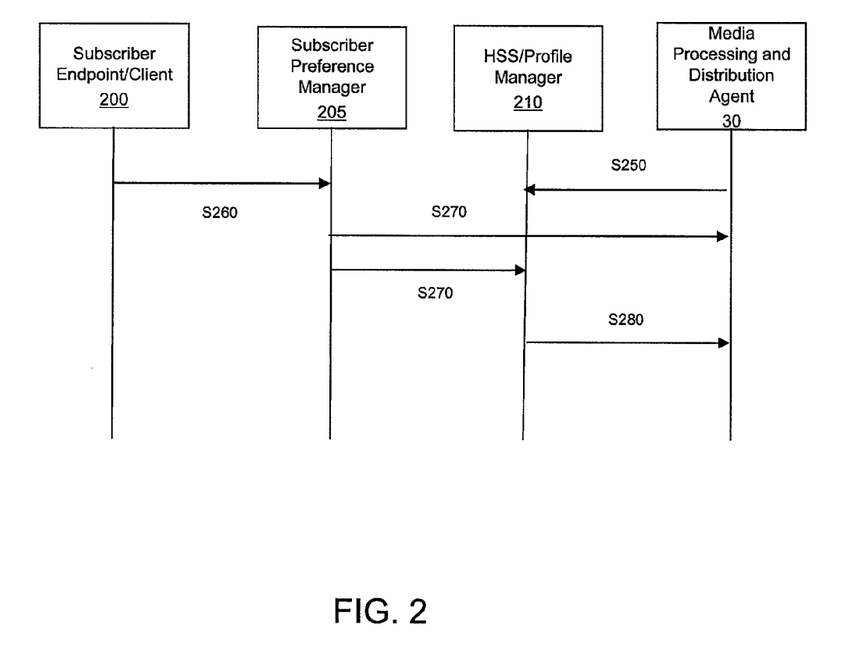
FIG. 2 shows a set-up implementation in accordance with the present invention.
Figure 3:
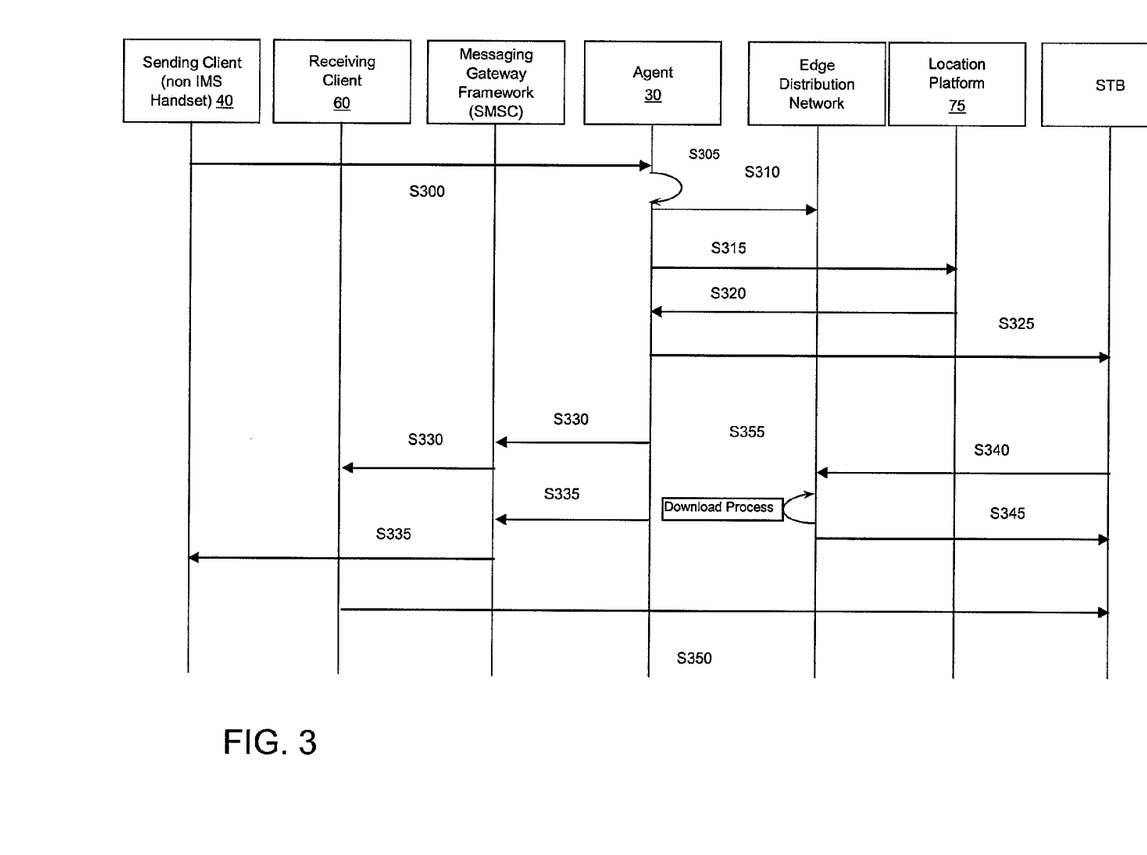
FIG. 3 shows a process flow for content distribution in accordance with the present invention.
Figure 4:
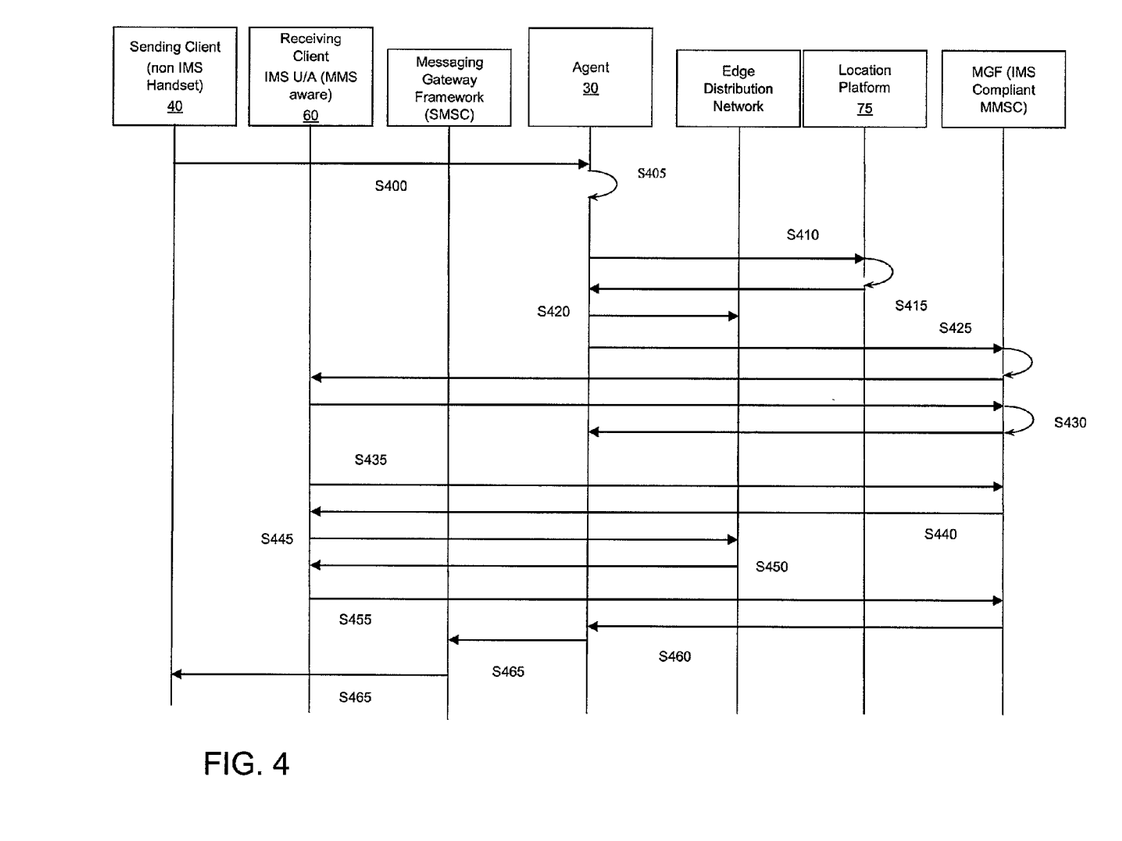
FIG. 4 shows a specific example of a process flow for content distribution in accordance with the present invention.

Generally, the invention includes a set-up flow and a content distribution processing flow. By way of example, FIG. 2 shows a set-up implementation in accordance with the invention; whereas, FIG. 3 shows a process flow for content distribution in accordance with the invention. FIG. 4 shows a specific example of a process flow for content distribution in accordance with the invention.

Although FIGS. 2-4 are shown as swim lane diagrams, it should be understood by those of skill in the art that the swim lane diagrams can equally represent flow diagrams or high-level block diagrams of components of the invention implementing the steps thereof. The processes of FIGS. 2-4 may be implemented on computer program code (via the Agent 30) in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM). Additionally, the computer program code can be transferred to a workstation over the Internet or some other type of network.

The invention can take the form of an entirely hardware embodiment or an embodiment containing both hardware and software elements (any of which is referred generally as "file management program"). The hardware and software elements include a computer infrastructure configured to implement the functionality of the present invention, as shown in FIG. 1. The software elements may be firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Referring to FIG. 2, the swim lane diagram shows the following participants: a sending client and receiving client (depicted generally as Subscriber Endpoint Client 200), a Subscriber Preference Manager 205 (also known generally as a web tool), an HSS/Profile Manager 210 and the Agent 30 (also referred to as a Media processing and Distribution Agent). It should be recognized by those of skill in the art that the Subscriber Preference Manager 205, HSS/Profile Manager 210 and Agent 30 may be supported, maintained, deployed, serviced and configured by the service provider, in any combination, as well as being implemented in the computing infrastructure of FIG. 1. The receiving client can represent a plethora of handsets (e.g., 2G, 3G and possibly 4G handsets), each of which have different rendering capabilities, browser based applications, portable media players, gaming consoles, non standard devices such as Set Top Boxes and applications which are endpoints by means of using REST or SOAP style invocations and providing end point implementations.

In the implementation of FIG. 2, at step S250, if necessary, the Agent registers with the HSS/Profile Manager. In one implementation, the HSS/Profile Manager is based on a Diameter infrastructure (e.g., in the case of IMS networks) in which case the HSS/Profile Manager will receive notifications from the Agent via a Diameter protocol when changes to subscriber profiles (preferences) are made by the Subscriber Endpoint Client. At step S260, the Subscriber Endpoint Client logs in and configures delivery and receipt of the preferences via the Subscriber Preference Manager. For example, in step S260, the Subscriber Endpoint Client can provide its preferences to the Subscriber Preference Manager via an HTTP. The Subscriber Preference Manager, in turn, updates the HSS/Profile Manager and, if necessary, the Agent (depending on the network (IMS vs. non-IMS enabled networks), at step S270. At step S280, if necessary, the HSS/Profile Manager sends notifications (via the Diameter protocol) to the Agent, so as to remain synchronized. Although a certain order is shown, the processes of the present invention may be provided in a different order, e.g., step S280 may be performed directly after or at any time after step S250.

It is to be noted that during call flow, HSS lookups do not have to be performed to aid in the overall performance of the system. Also, any information received via the Diameter protocol as part of the provisioning process (e.g., set-up process) can be cached within the Agent platform (e.g., storage system 22B). Moreover, it is contemplated by the present invention that the set-up information can be periodically updated and, as such, provisions are provided to update the database so to add new devices and/or other preferences, when requested by the Subscriber Endpoint Client (sending client or receiving client), to the solution mix.

FIG. 3 shows a representative call flow implementing a runtime operation of the system. In this representative call flow, content is delivered from one subscriber to another subscriber, using SMS and a Set Top Box as the end points in play, in a non IMS context. More specifically, at step S300, the sending client makes a request to the Agent. Upon receipt, the Agent retrieves both the sending client and the receiving client preferences (profile) at step S305. In this way, the Agent can determine the method of content delivery to the receiving client, as well as the type of transcoding operations and other operations (such as the performing of location dips using a location platform) that are required to transmit the content to the receiving client. Also, the sender preferences are used, for example, to determine how delivery reporting, e.g., notifications, can be delivered to the sending client and/or the receiving client.

At step S305, if necessary, the Agent can perform value added processing such as, for example, transcoding, as well as make a determination of the actual delivery channels. It is also contemplated that the transcoding, to save overhead, can be performed by the sending client or other participant, if resources (e.g., hardware and software) are available on the particular devices.

At step S310, the content can be delivered to an edge content location for future retrieval by the preferred device of the receiving client (e.g., STB). The content can be delivered directly from the sending client or, in other embodiments, via the Agent.

At step S315, if necessary, the Agent contacts the location platform to determine the location of the receiving client. (In embodiments, the location platform may be part of the Agent.) This can be done in any conventional manner such as, for example, via a GPS transceiver or other known messaging. At step S320, the location platform determines the location of the receiving client and provides this location information to the Agent. As such, the location, geographic separation and preferences of both the receiver and the sender may be used as factors implementing one or more rules within the system and method of the invention. The communication with the location platform may be performed via an Open LS Request and Response, for example. It should be recognized, though, that other communication protocols are also contemplated by the invention, as discussed herein.

At step S325, the Agent notifies the preferred device of the receiving client that content is ready for delivery. In embodiments, depending on the content and delivery preferences, the notification can be provided to a STB (Set Top Box) or other user-defined device. For example, after determining that the receiving client is at or near his/her residence and based on the preferences of the receiving client, the Agent can send a notification of content to the STB in the receiving client's residence. The notification can be a reference to the content which resides, for example, on the edge network distribution (e.g., a server at the edge of the network, geographically nearer to the target client). The content can be retrieved by the STB or other preferred device, for example, from the server on the network, via the reference.

At step S330, a notification can be provided to the cellular telephone or other device of the receiving client, again depending on the preferences. This notification will notify the receiving client that content is ready to be downloaded on a preferred device. In the case of a cellular telephone, for example, the notification can be sent to the Messaging Gateway Framework (65) via a short message peer-to-peer protocol (SMPP) notification and then to the target client via an SMS notification. Similarly, at step S335, a notification can also be provided to the cellular telephone or other device of the sending client, again depending on the preferences. Again, in the case of a cellular telephone, for example, the notification can be sent to the Messaging Gateway Framework via a SMPP notification and then to the sending client via an SMS notification. This notification can indicate, amongst other notices, that the receiving client has received a notification of the content and/or has downloaded the content.

At step S340, the preferred device of the receiving client (in this example the STB), requests the content from the server. In this example, the STB (or other preferred device) asynchronously requests the content and downloads it locally. At step S345, the content is sent to the preferred device. In embodiments, as discussed above, the Agent can send a notification to the sending client that the content has been delivered to the receiving client. At step S350, the receiving client can view the content on the preferred device.

FIG. 4 shows a specific example of a process flow for content distribution implementing a SIP enabled MMS delivery in an IMS compliant environment in accordance with the invention. More specifically, in this example, the process flow shows an MMS (multimedia messaging system) based delivery in an IMS environment using the MMS SIP specification (i.e., 3GPP2 X.S0016x-312), as applicable to this environment. In this example, it is assumed that all regular pre-processing of the SIP User Agent (UA) that is Multimedia enabled has occurred, prior to the implementation of the remaining processing. For example, the pre-processing includes:

The SIP UA has already registered with the IMS core (registrar) via S-CSCF (IP Multimedia subsystem) and any IFC (Internet Firewall Connection) via the HSS; and The MMS infrastructure is SIP aware and IMS compliant and is also registered to participate in the interaction.

Also, it should be recognized that to simplify the call flow for illustrative purposes, the interaction from the Agent and the SIP aware MMSC (Multimedia Messaging Switching Center) is not depicted as flowing through an S-CSCF node(s). Also, as discussed above, as the media objects can be large, indirect notification via a reference is assumed, which is a specification supported case. Also, FIG. 4 does not show delivery reporting in detail as the purpose of this swim lane diagram is to focus on a methodology of content distribution in accordance with the invention.

Referring now specifically to FIG. 4, at step S400, the sending client makes a request to the Agent (for delivery of content to a receiving client). In this embodiment, the sending client is on a non IMS handset and, as such, the request is not a SIP U/A. At step S405, the Agent performs the following exemplary types of activities:

determines preferences of all involved participants. For example, the receiving client preferences will inform the Agent how the content is to be delivered and what type of transcoding operations and other operations (such as the performing of location dips using a location platform) are needed to send the content. The sending client preferences are needed to determine how delivery reporting can be delivered; and determines the actual delivery channels to use in both directions.

At step S410, the Agent opens communication with the location platform, if necessary, to determine the location of the receiving client. At step S415, the location platform determines the location of the receiving client and provides this location information to the Agent. As noted above, the location, geographic separation and preferences of both the receiver and the sender may be used as factors implementing one or more rules within the system and method of the invention. The communication with the location platform may be performed via an Open LS Request and Response, for example. It should be recognized, though, that other communication protocols are also contemplated by the invention, as discussed herein.

At step S420, after the Agent determines that there is an SIP end point, the content is transcoded and sent to the edge caching tier for temporary transient storage. At step S425, the Agent sends a SIP message request (notification of content) to the IMS Compliant MMSC, which then contacts and notifies the SIP U/A, on the receiving client, that content is available for viewing. The IMS Compliant MMSC may be a Media Gateway Framework (MGF), which includes the set of delivery channels identified in FIG. 5. The MGF uses the instructions it is provided, based on the preferences, to route notifications and data to both endpoints (sending client and receiving client).

At step S430, the receiving client sends a SIP message response to the IMS compliant MMSC, which makes it back to the Agent (via the MMSC). At step S435, the receiving client (SIP U/A) requests the message contents by sending an indirect message request to the MMSC. At step S440, the MMSC responds with a Message Response SIP message with the indirect reference to the content's logical location in the edge distribution network.

At step S445, the receiving client (SIP U/A) requests the content via an MM1_Retrieve.REQ request. It should be understood by those of skill in the art that the request could have also been sent directly to the MMSC. At step S450, the receiving client receives an MM1_Retrieve.RES in response to the request. At step S455, the SIP U/A generates a delivery acknowledgement via the MM1_Acknowledgement REQ SIP message sent to the MMSC. At step S460, the MMSC notifies the Agent with the same MM1_Acknowledgment REQ message. At step S465, the Agent generates an SMPP message to be delivered to the originating (sending client) handset via the Messaging Gateway Framework, which will generate an OTA SMS message. This SMS message will confirm delivery receipt of the content to the receiving client.

Exemplary Architecture of the System of the Invention

Figure 5:
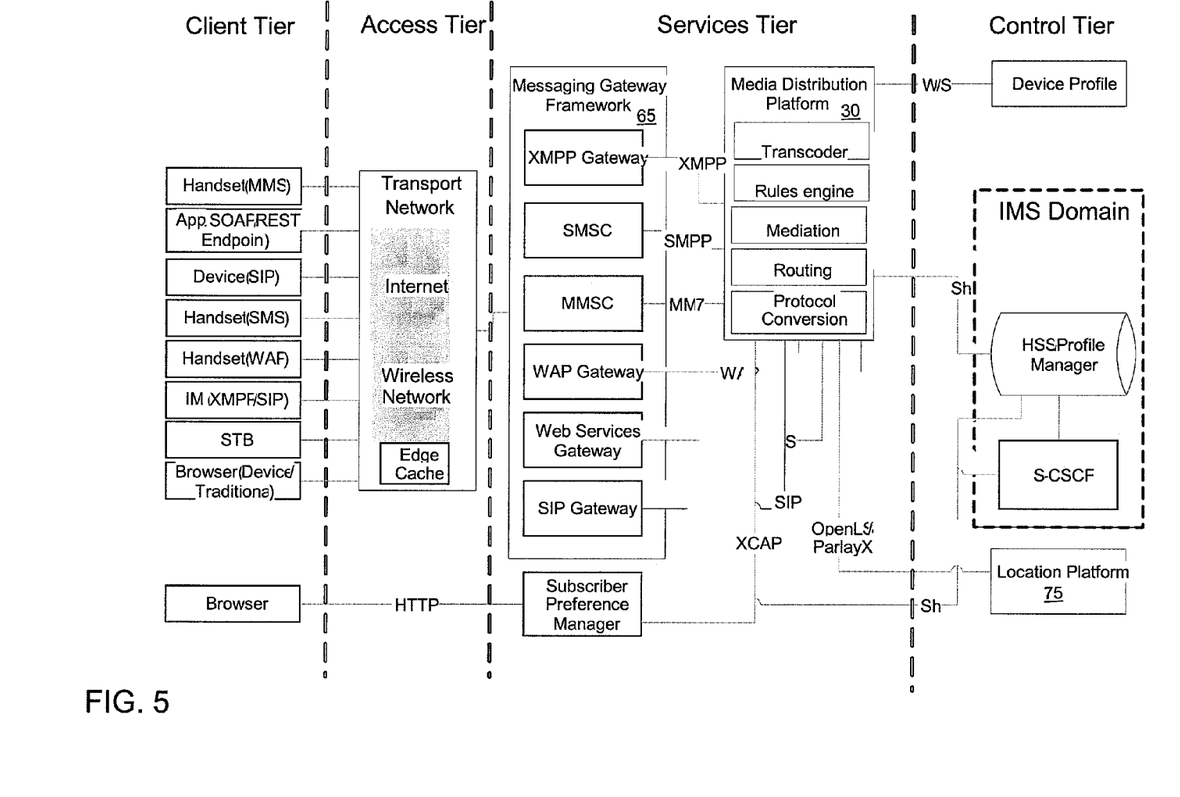
FIG. 5 shows an architect implementing aspects of the present invention.

FIG. 5 shows an exemplary architecture of the system of the invention. In one contemplated embodiment, the architecture includes four tiers: a Client Tier, an Access Tier, a Services Tier and a Control Tier. The Client Tier represents different types of exemplary delivery and user agent endpoints (receiving client and sending clients) that can be supported with the invention. For example, the Client Tier includes MMS, SMS and WAP handsets, as well as STB, traditional browser type devices, SOAP and REST compliant devices, SIP devices and IM (XMPP/SIP) devices. Each of these devices/handsets is compatible with the system such that they can receive notifications and/or content in accordance with the invention. The Client Tier can also include a browser for initial set-up (refer to FIG. 2).

The Access Tier primarily depicts the transport network which may include the Internet, Wireless Network or edge Cache, amongst other channels of delivery. These channels of delivery will deliver the content and any required notifications via the respective protocols. As discussed above, the content and notifications can be delivered on different channels, depending on the preferences and type of content.

The Services Tier primary contains the Messaging Gateway Framework 65 and the Agent 30 with all the protocol support required to connect to the underlying telecommunications infrastructure platform as well as to the Messaging Gateway Framework via the various protocols that are required for delivery of the content. For example, the Messaging Gateway Framework supports: XMPP (Extensible Messaging and Presence Protocol) Gateway, SMSC (SMPP), MMSC (MM7), WAP Gateway, Web Services Gateway (W/S), and/or SIP Gateway. All of these protocols can be supported by the system and method of the invention, unlike in known technologies.

The Agent is shown as a Media Distribution Platform. The Platform includes a transcoder, as well as a rules engine, mediation, routing and protocol conversion engine. In embodiments, as the sender of content may have no visibility into the receiver's rendering capabilities, the rules engine will be used to parse the preferences of the sender and the receiver in order to coordinate the delivery of the content by the Agent. The mediation can be an Enterprise Service Bus which is configured to apply the rules (preferences). The protocol conversion engine is a core function which converts the content from one protocol to another protocol, again depending on the content and preferences. For example, the protocol conversion engine can convert data transmission from asynchronous to synchronous, TCP/IP to another protocol, etc.

The Control Tier primarily comprises elements of the IMS control (e.g., S-CSCF and an HSS). The Control Tier also includes elements of the non IMS tier networks. For example, a device profile component may be included in the Control Tier, which is a database (e.g., Storage System 22B) storing the preferences of the end points (sending client and receiving client). The Agent can communicate with the device profile via W/S. The Client Tier also includes the location platform which is in communication with the Agent via Open LS or Parlay X.

Exemplary Uses Implementing the System and Method of the Invention

The present invention also implements a Media Baseline which allows the system and method to generate one baseline representation of media and send each user the corresponding media to their respective and desired device. For example, a baseline XML for Multiple Notifications can be written as follows:

```
<Media>
    <recipients>
        <User ="404 555 1212">
    </recipients>
    <subject>
```

With the subject as follows:

```
    </subject>
    <body>
```

With the body as follows:

```
</body>
<preview type="video">
</preview>
<uncompressed>
</uncompressed>
</compressed type="quicktime">
</compressed>
</Media>
```

Additionally, a representative set of exemplary call flows are described below. These call flows describe some of the services and capabilities that are implemented using the system and method of the invention, based on user preferences.

View Content

A subscriber views some content on his/her browser and wants to notify his/her friends about the content. He/She requests the system to deliver the content to the friend. As a case in point, one of the subscribers has requested that the content be sent to a Set Top Box at home. When that subscriber gets home (location platform dip), and turns on the television, he/she is notified about the content and views the content, which has been downloaded to his Personal Storage Device at his residence.

Create Content

A subscriber creates content on his/her device and wants to notify his/her friends about the content. He/She requests the system to deliver the content to the friend. As a case in point, one of the subscribers has requested that his content be sent to his Set Top Box at home. When that subscriber gets home (location platform dip), and turns on his TV, he/she is notified about the content and views the content, which has been downloaded to his Personal Storage Device at his residence.

Notification Scenarios

A subscriber gets an SMS notification about some content sent to his/her media player on his home personal computer. He/She logs into his/her personal computer at home and views the content.

A subscriber gets an SMS notification about some content sent to his/her media player on his home Entertainment System or personal computer. He/She may retrieve a proxy or synopsis of that content on the mobile device.

A subscriber gets a WAP based notification sent to his device, transcoded to the format that his/her device can support and views the content immediately.

While the invention has been described in terms of embodiments, those skilled in the art will recognize that the invention can be practiced with modifications and in the spirit and scope of the appended claims.

What is claimed is:

1. A method, comprising:
   receiving preferences from a sending client and a receiving client;
   receiving content in a first media type over a network;
   sending the content in a second media type or a reference to the content in the second media type, to a first device of the receiving client in accordance with the preferences;
   notifying the first device and a second device of the receiving client that the content in the second media type is to be received by the first device in accordance with the preferences, the preferences including a request by the receiving client to receive notifications on the first device and the second device that the content in the second media type is to be received by the first device; and
   notifying, by an agent, the sending client that the receiving client has at least one of received the notifications and received the content in the second media type,
   wherein the preferences include at least a media size limit.

2. The method of claim 1, further comprising requesting and receiving location information of the receiving client in order to send the content in the second media type or a reference to the content in the second media type, to the first device.

3. The method of claim 1, wherein the preferences include at least:
   a list of devices to receive the content in the second media type;
   a location preference of the receiving client;
   a list of notification types to inform the sending client and/or the receiving client of receipt of the content in the second media type;
   a media format (media type) for the receiving client to receive the content in the first media type; and
   a request by the receiving client to view same content on multiple devices.

4. The method of claim 1, wherein the first and second devices are IMS (IP Multimedia Subsystem) or non-IMS enabled devices, and the sending uses IMS based core networks and non-IMS based networks, to deliver the content in different media types to the receiving client.

5. The method of claim 1, wherein the sending is subscriber driven media agnostic content delivery across networks and is of a peer to peer distribution and delivery of the content in different media types or supported on a completely wireless broadband based architecture.

6. The method of claim 1, wherein the sending includes routing content in different types over different types of networks and at least one of different protocols and to disparate devices based on the preferences.

7. The method of claim 1, wherein the sending is routed through a Messaging Gateway Framework which supports at least:
   XMPP (Extensible Messaging and Presence Protocol);
   MMSC (Multimedia Messaging Switching Center);
   WAP (Wireless Application Protocol);
   SMS (Short Message Service) and SMTP (Simple Mail Transfer Protocol), including out of band notifications;
   IMS Handsets via a SIP (Session Initiation Protocol) client;
   Web Services (SOAP and REST); and
   STB (Set Top Box).

8. The method of claim 7, wherein the preferences are received from the receiving client and the sending client via the Messaging Gateway Framework in any of the protocols.

9. The method of claim 1, further comprising, at least one of:
   based on a preference of the receiving client, transcoding the content in the first media type in order for the receiving client to view the content in the second media type, wherein the first media type is different than the second media type; and
   converting a protocol of the first media type.

10. The method of claim 1, wherein a service provider performs the steps of claim 1 on a fee or a subscription basis.

11. The method of claim 1, wherein the steps of claim 1 are provided on a computing infrastructure which is at least one of maintained, deployed, supported and created by a service provider.

12. The method of claim 1, wherein:
   the notifying the sending client is in accordance with the preferences;

the preferences include a list of notification types to inform the sending client of receipt of the content; and the preferences include a list of best times to at least one of send and receive the content.

13. The method of claim 1, wherein the sending client and the receiving client update the preferences in a Home Subscriber Service (HSS) Profile Manager when the content in the second media type is of an IMS (IP Multimedia Subsystem) network.

14. The method of claim 13, further comprising receiving the preferences via a Diameter protocol so as to remain synchronized with the HSS Profile Manager.

15. The method of claim 14, further comprising, based on a preference of the receiving client, transcoding the content in the first media type in order for the receiving client to view the content in the second media type, wherein the first media type is different than the second media type.

16. The method of claim 15, wherein the sending client transcodes the content in the first media type in order for the receiving client to view the content in the second media type when resources are available on the sending client.

17. The method of claim 16, wherein each of the notifications comprise a baseline representation of the content in the second media type that is written in Extensible Markup Language (XML) and comprises one or more recipients, a subject, a body, a preview type, an uncompressed type, and a compressed type.

18. A method for sending subscriber driven media agnostic content delivery across different networks, comprising:
    parsing, by a computer infrastructure, preferences of a sending client and a receiving client in order to send content in a media type preferred by at least one of the sending client and a receiving client, or a reference to the content in the media type, to a first device of the receiving client; and
    notifying the first device and a second device of the receiving client that the content in the media type is to be received by the first device in accordance with the preferences, the preferences including a request by the receiving client to receive notifications on the first device and the second device that the content in the media type is to be received by the first device,
    wherein the preferences include at least a list of notification types to inform the sending client of receipt of the content in the media type, and a media size limit.

19. The method of claim 18, wherein the computing infrastructure is operable to request and receive location information of the receiving client in order to send the content in the media type or the reference to the content in the media type, to the first device.

20. The method of claim 18, wherein the computing infrastructure is operable to store the preferences which include at least:
    a list of devices to receive the content in the media type;
    a location preference of the receiving client;
    a list of notification types to inform the receiving client of receipt of the content in the media type; and
    a request by the receiving client to view same content on multiple devices.

21. The method of claim 18, wherein the first and second devices are IMS (IP Multimedia Subsystem) or non-IMS enabled devices, and the sending uses IMS based core networks and non-IMS based networks, to deliver content of different media types to the receiving client.

22. The method of claim 18, wherein the computing infrastructure is operable to route content of different types over different types of networks and/or protocols and/or to disparate devices based on the preferences.

23. The method of claim 18, wherein the computing infrastructure is operable to register the preferences with a Home Subscriber Service (HSS) Profile Manager when the content in the media type is of an IMS (IP Multimedia Subsystem) network.

24. The method of claim 18, wherein the computing infrastructure is operable to receive the preferences from the receiving client and the sending client via a Messaging Gateway Framework, regardless of protocol and media type.

25. The method of claim 18, wherein the computing infrastructure is operable to, based on a preference of the receiving client, transcode the content in an original media type in order for the receiving client to view the content in the media type.

26. The method of claim 18, wherein the computing infrastructure is at least one of maintained, deployed, supported and created by a service provider.

27. The method of claim 18, wherein:
    the computer infrastructure is operable to notify the sending client that the receiving client has at least one of received a notification of the content and received the content;
    the notifying the sending client is in accordance with the preferences; and
    the preferences include a list of best times to at least one of send and receive the content.

28. A network infrastructure, comprising at least a computing device comprising an agent which is configured to:
    receive and store preferences of a sending client and a receiving client; and based on the preferences:
        convert a first media type sent from the sending client to a second media type requested by the receiving client;
        send notifications to a first device and a second device of the receiving client that the second media type is ready to be downloaded on the first device in accordance with the preferences, the preferences including a request by the receiving client to receive the notifications on the first device and the second device; and
        send the second media type to the first device which is compatible with the second media type,
    wherein the preferences include at least a list of best times to at least one of send and receive the second media type, and a media size limit.

29. The network infrastructure of claim 28, further comprising requesting and receiving location information of the receiving client in order to send content in the second media type or a reference to the content in the second media type, to the first device.

30. The network infrastructure of claim 28, wherein the preferences include at least:
    a list of devices to receive content in the second media type;
    a location preference of the receiving client;
    a list of notification types to inform the sending client and/or the receiving client of receipt of the content in the second media type;
    a media format (media type) for the receiving client to receive the content in the first media type; and
    a request by the receiving client to view same content on multiple devices.

31. The network infrastructure of claim 28, wherein the receiving and storing of the preferences, the sending of the notifications and the sending of the second media type is routed through a Messaging Gateway Framework which support at least:
    XMPP (Extensible Messaging and Presence Protocol);
    MMSC (Multimedia Messaging Switching Center);

WAP (Wireless Application Protocol);
SMS (Short Message Service) and SMTP (Simple Mail Transfer Protocol), including out of band notifications;
IMS Handsets via a SIP (Session Initiation Protocol) client;
Web Services (SOAP and REST); and
STB, and
wherein the notifications can be provided via any of the supported Messaging Gateway Framework protocols.

32. The network infrastructure of claim 28, wherein:
the agent is configured to notify the sending client that the receiving client has at least one of received a notification of content and received the content;
the notifying the sending client is in accordance with the preferences; and
the preferences include a list of notification types to inform the sending client of receipt of the content.

33. A computer readable storage medium for managing subscriber driven media agnostic content delivery across networks, the computer readable storage medium comprising:
first program instructions to receive preferences from a sending client and a receiving client;
second program instructions to receive content in a first media type over a network;
third program instructions to send the content in a second media type or a reference to the content in the second media type, to a first device in accordance with the preferences; and
fourth program instructions to notify the first device and a second device of the receiving client that the content in the second media type is to be received by the first device in accordance with the preferences, the preferences including a request by the receiving client to receive notifications on the first device and the second device that the content in the media type is to be received by the first device; and
fifth program instructions to notify the sending client that the receiving client has at least one of received the notifications and received the content in the second media type;
wherein the preferences include at least a media size limit, and
wherein the first, second, third, fourth and fifth program instructions are stored on the computer readable storage medium.

34. The computer readable storage medium of claim 33, wherein:
the notifying the sending client is in accordance with the preferences;
the preferences include a list of notification types to inform the sending client of receipt of the content; and
the preferences include a list of best times to at least one of send and receive the content.

35. A method, comprising:
receiving preferences from a sending client and a receiving client;
receiving content of a first media type over a network;
sending the content in a second media type or a reference to the content in the second media type, to a first device in accordance with the preferences; and
notifying the first device and a second device of the receiving client that the content in the second media type is to be received by the first device in accordance with the preferences, the preferences including a request by the receiving client to receive notifications on the first device and the second device that the content in the second media type is to be received by the first device,
wherein the preferences include at least a request by the receiving client to view same content on multiple devices.

* * * * *